Sept. 6, 1927.
C. W. WATSON
1,641,793
HOLLOW STRUCTURE OF PLASTIC MATERIAL AND PROCESS
AND MEANS FOR PRODUCING THE SAME CENTRIFUGALLY
Filed July 16, 1926     3 Sheets-Sheet 1
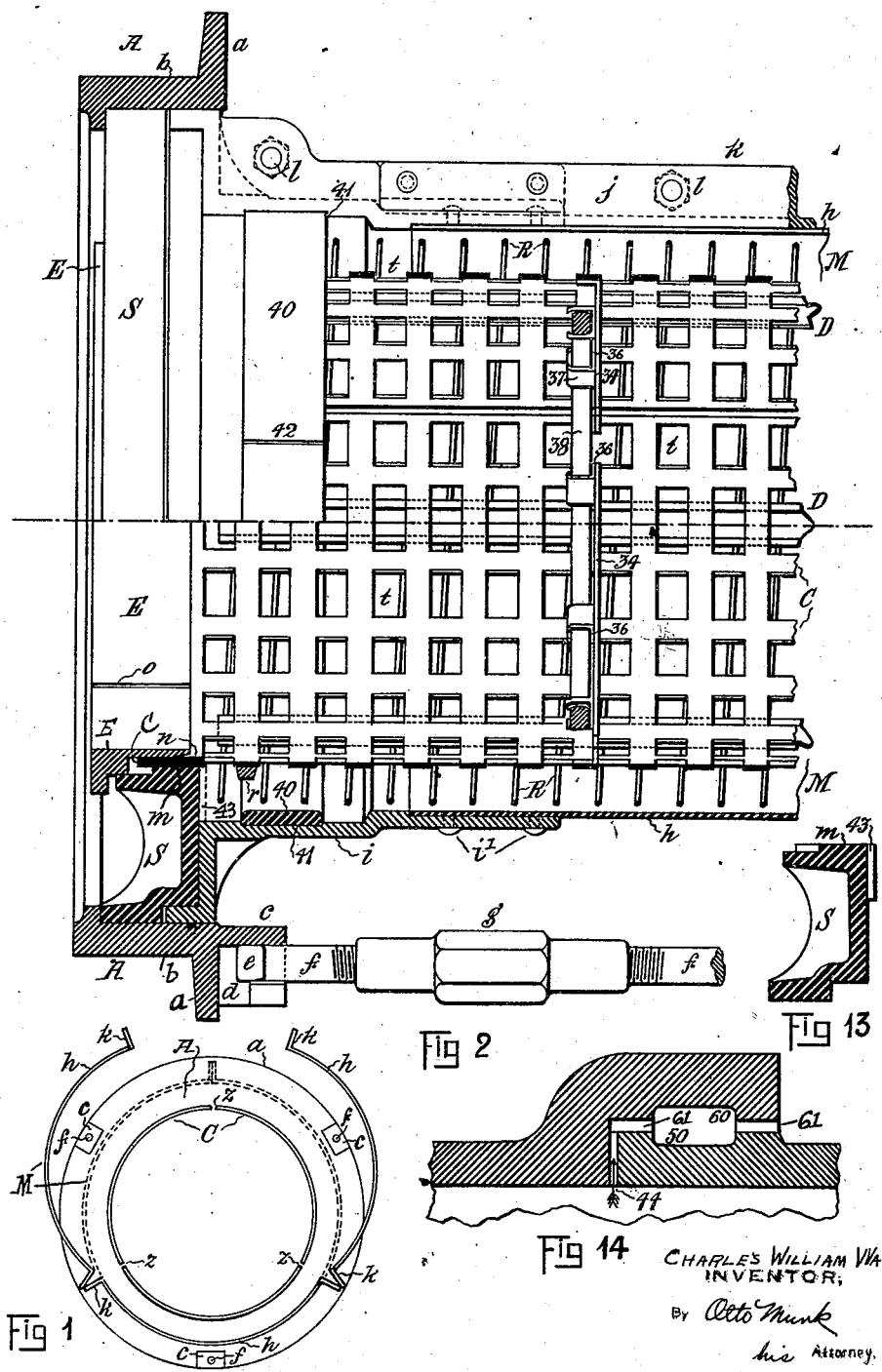
CHARLES WILLIAM WATSON
INVENTOR;
By Otto Munk
his Attorney.

Sept. 6, 1927.  1,641,793
C. W. WATSON
HOLLOW STRUCTURE OF PLASTIC MATERIAL AND PROCESS
AND MEANS FOR PRODUCING THE SAME CENTRIFUGALLY
Filed July 16, 1926    3 Sheets-Sheet 2
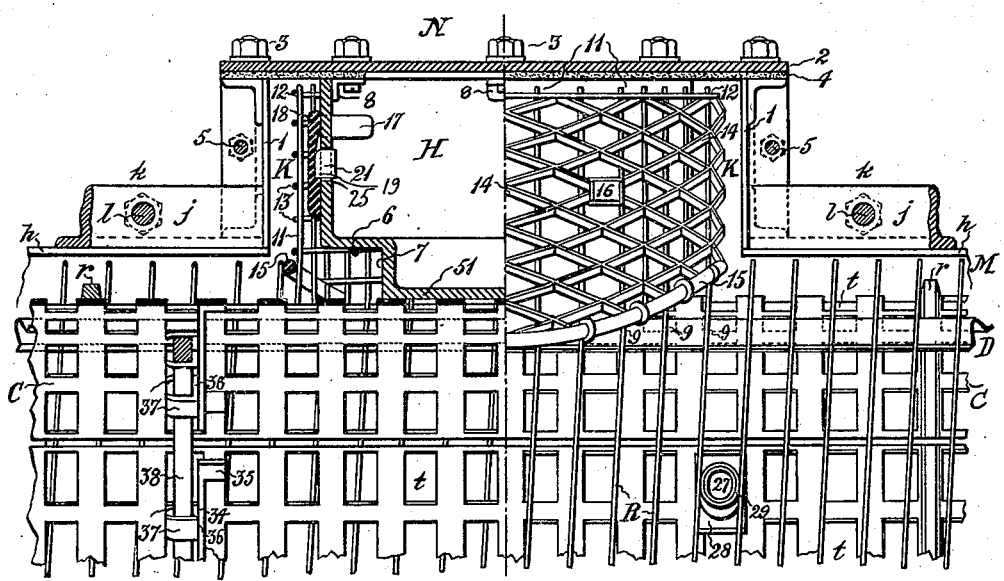
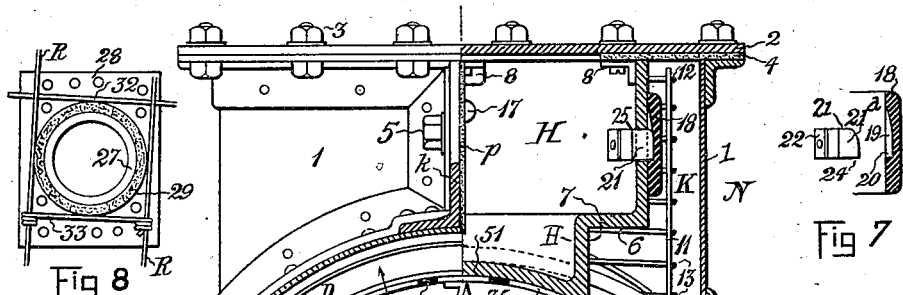
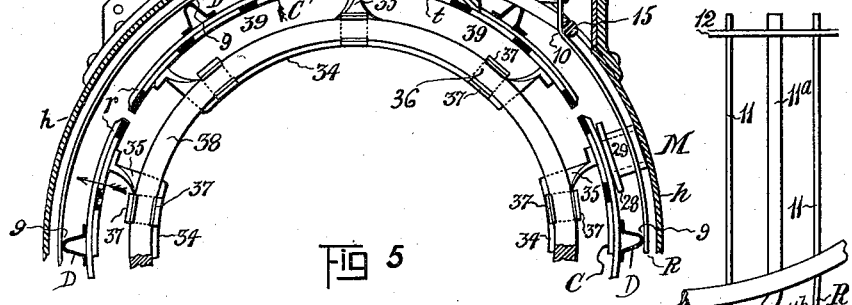
CHARLES WILLIAM WATSON
INVENTOR.
By Otto Munk
his ATTORNEY

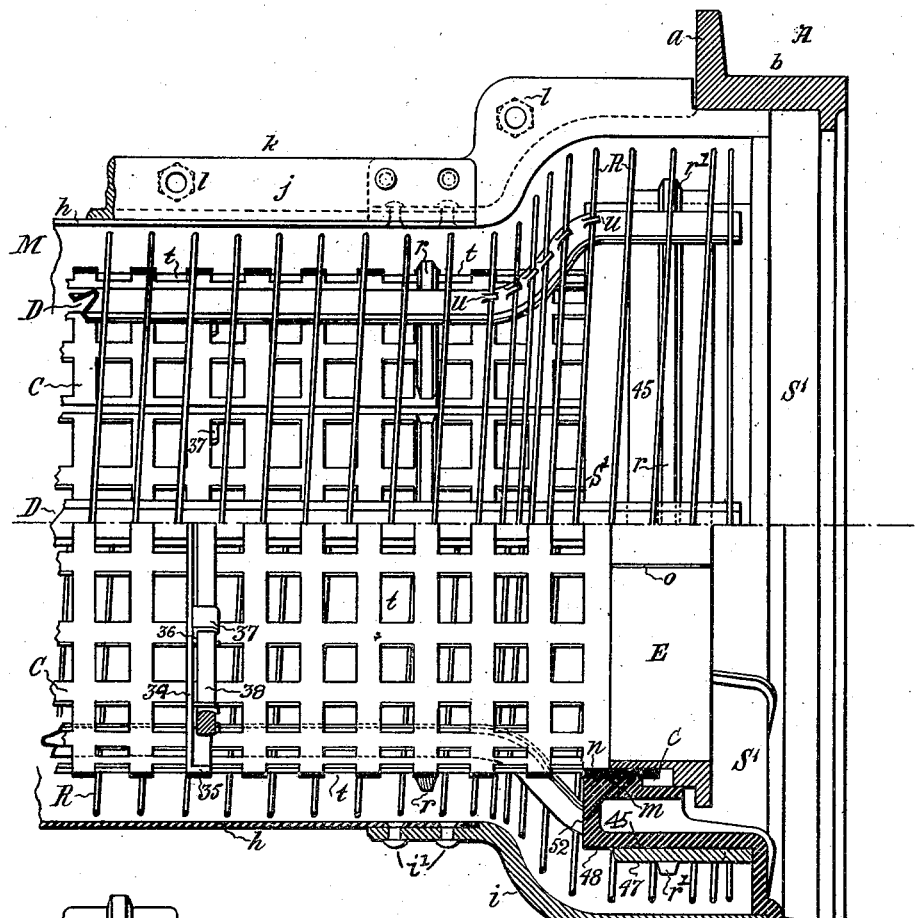
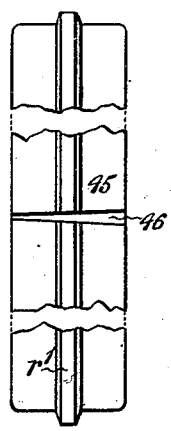
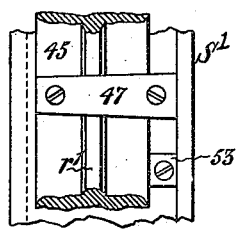
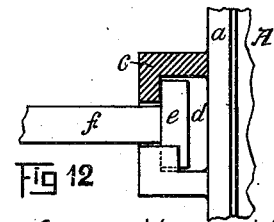

Patented Sept. 6, 1927.

1,641,793

UNITED STATES PATENT OFFICE.

CHARLES WILLIAM WATSON, OF ST. KILDA, VICTORIA, AUSTRALIA.

HOLLOW STRUCTURE OF PLASTIC MATERIAL AND PROCESS AND MEANS FOR PRODUCING THE SAME CENTRIFUGALLY.

Application filed July 16, 1926, Serial No. 122,819, and in Australia April 29, 1926.

My invention has for an object to produce by centrifugal action a reinforced hollow structure of plastic material such as a pipe, with one or more branches between its ends, with the reinforcement in predetermined position. Reinforcement of coiled wire combined with longitudinal members has been used in pipes made centrifugally, but branched structures, reinforced throughout, have not been centrifugally made hitherto. A structure has been made with a branch, but the latter was not consolidated centrifugally as in my case and would not withstand the heavy internal pressure that might occur in use, and had various other drawbacks.

Another object of my invention is to employ an improved method of producing configurations of interior and exterior surfaces of centrifugally consolidated structures, branched or plain; and reinforced or plain. Other features of this invention will be apparent from the following.

Herein, by way of example I explain the formation of an improved reinforced branched concrete pipe having the reinforcement of its trunk and branches unified, and the concrete homogeneous throughout, and having contoured ends, those illustrated being of spigot and faucet form. The invention is also applicable to the production of other structures, including hollow telegraph, telephone, tramway, railway and other posts, pier piles, building columns, containers, and so on, any of which may have apertures for branch and like purposes.

Branches may extend at any suitable angle from the trunk. Each structure branch and branches will be of any preferred cross section, as cylindriform, ovoform, polygonal, square, and so on.

I position reinforcement as predetermined relatively to rotatable moulding means including integrally one or more branches, supply concrete, and produce centrifugal action. I produce a predetermined thickness of concrete covering the reinforcement exteriorly and interiorly. The reinforcement consists of, for example, longitudinal bars or rods combined with cylindrical reinforcement such as coiled wire.

The moulding means comprises outer and inner members herein for distinctiveness called a mould and a core respectively. I employ anti-deformation devices, illustrated by rings, positioned suitably relatively to the core, or united thereto as by welding. The rotative mechanism is termed herein a rotor. To meet possible variations of the position of the centre of gravity of the concrete structure during the centrifugal process, I secure on the rotor at will, in suitable location, a counterbalancing mass or masses, not claimed to be new.

Herein the term "trunk" distinguishes the main body of the structure, or moulding means, from a branch; the term "reinforcement" includes coiled and other described reinforcing material.

The word "concrete" is used for brevity to include any suitable material, which is plastic during the centrifugal action, but which consolidates, and the word "structure" includes any pipe or hollow article which my invention allows of making.

The mould and core are made of any suitable connected sections preferably of segmental form and there are core perforations as herein described.

Any suitable rotor mounting is employable such as one supporting the rotor ends on rollers by which the rotor will be driven. To centrifugally mould a pipe having spigot and faucet ends by means of a rotor each core end is provided with a configuring element within an annulus the periphery of which is the roller path.

In the accompanying drawings, which are diagrammatic, corresponding parts are shown by the same reference characters.

Figure 1 is a diagram of a rotor in sectional end view.

Figure 2 is in part a longitudinal section, vertically, and in part an elevation of the spigot end of the rotor.

Figure 3 is a continuation relatively to the upper part of Figure 2, and shows parts of the rotor, some parts being in vertical section, with branch moulding elements, alternative types of branch reinforcement being shown for purposes of description.

Figure 4 is in part a longitudinal section, and in part an elevation at the faucet end of the rotor.

Figure 5 is in part an exterior view, and in part a transverse section through Figure 3, showing branch moulding elements.

Figure 6 is a sectional view of part of a mould showing a latch of a branch element.

Figure 7 is a transverse section through Figure 6, showing latch parts separated.

Figure 8 is a plan of a branch socket of simpler form.

Figure 9 is a sectional elevation of the parts in Figure 8, with adjacent parts of the moulding means.

Figure 10 is a plan of part of a moulding ring of variable diameter.

Figure 11 shows part of Figure 10 with a locking wedge as used in the rotor.

Figure 12 is a partly sectional plan of a housed tie-bar head.

Figure 13 is a section of a configuring element for forming a spigot.

Figure 14 is a section of structure ends assembled and having a spigot and faucet respectively.

Figure 15 shows parts of branch reinforcement.

A are annuli, each with a body $b$ which forms a roller path, and a flange $a$; M as a whole is the mould having its shell $h$ suitably formed of segments with connectable flanged edges $k$. Additional segments may be fitted to any moulding element to enable the spaces to be provided for the moulding of structures to be of any length required; $t$ are core apertures. The mould shell $h$ may be if desired in one piece, capable of expansion or contraction as required.

Tie-bars $f$ have right and left threaded couplings $g$ and at each outer end a head $e$ in a chamber $d$ formed by a wall $c$, which is integral with annulus A. These couplings adjust the pressure on the rotor ends by drawing the annuli towards one another.

Flanges $j$ of angle irons $k$ of shell $h$ are fastened together by bolts and nuts $l$. Between the flanges rubber, as sealing material, is usable. Such a mould has means hereinafter described for contouring the ends and/or intermediate parts. C is a trunk core having perforations $t$. Each core end $n$ is, for strength, preferably thickened.

I provide configuring end rings S, $S^1$ each exteriorly and interiorly contoured to meet requirements and form for example a faucet and a spigot at respective ends of a concrete pipe; or the latter may be double spigotted; or be made with flanges of any required form; any trunk and branch can have any end shaped to suit requirements.

The shell $h$ carries configuring ends $i$ shown as of ring form, attached by rivets $i^1$.

The end elements S, $S^1$ provide seats $m$ for core ends. E is a locking ring of variable diameter, and can be removed with core C and any attached parts to leave surface $m$ usable as a gauge guide as hereinafter explained, and allow of determining the thickness of the pipe wall, subject to any addition of finishing material; but the said locking ring may be similarly used as a guide. Ring E holds the core securely against surface $m$ (see Figures 2 and 4).

R indicates convolutions of reinforcement wire; prior to the coiling of the latter I distribute within the core supports shown as removable rings 38, and (see Figure 5) arcuate brackets 34 each with (see Figure 3) legs 35 and U clips 36, the legs being fixed to the core as by welding. The clips have resilient fingers 37 which seize and maintain a ring 38, which is restrained against displacement while in use. In Figure 5 there is a circular space 39 between ring 38 and core C, but if space 39 and the bracket be omitted, and rings 38 be of larger diameter, they would be secured direct to the core. When plastic material is supplied to the core interior it will flow during the rotation as uninterruptedly as possible outwardly through core apertures $t$.

As part of the reinforcement, I provide any suitable number of retainers D, that is longitudinal metal bars of any suitable cross section, united to the coils where required, as by welding, and carrying at will blocks of material, these retainers thus positioning the coiled reinforcement. I prefer retainers having edge flanges to contact with (see Figures 3 and 5) suitable projections shown as arcuate ridges $r$ which are contoured to facilitate withdrawal from the plastic material, and are distributed along and project from the core, being fixed as by welding. Where they will be useful, that is on diverging parts of the retainers D, Figure 4, I provide tongues $u$ to hold in correct position convolutions of reinforcement which extend around the said diverging parts, so that the retainers and reinforcement carried thereby will retain their positions during the centrifugal process, the whole reinforcement becoming embedded in predetermined position in the plastic material, the thickness of which will be determined by varying the setting of the retainers; or the depth of any suitable ridges $r$, or contractible resilient rings, which may be longitudinally adjusted where desired gripping core C.

N shows a branch mould, formed of united parts shown as halves, each carried by a segment of the trunk mould M, Figure 1 showing such segments dotted. The meeting faces of the halves register (see Figures 3 and 4) flush with attached angle irons $k$, packing $p$ being added if required to prevent leakage. This branch mould has a shell 1 formed of halves, and a cover 2 which helps to hold the halves closed, packing 4 being used under the cover if required; nutted bolts 3 hold the cover down. This branch mould has a core H, suitably contoured, to form a faucet K for example. It has a surface 6 to form, within the branch to be produced, a seating for another pipe. A branch core surface 7 will form, in the concrete, the branch bore, in direct communication with the bore of the trunk of the pipe. The branch core has, to contact with the exterior of the trunk core, a surface 51, see Figure 3, of any suitable contour which will prevent flow of plastic material into the branch core bore; packing material, not shown, may be inserted next to the surface 51.

The contour of surface 6 may be according to Figure 3. Reinforcement of a branch is helical, or cylindrical; and I show at one part of Figure 3 coiled wire 13 over retainers, but at another part retainers are shown combined with apertured metal 14; both forms would not, however, be adopted in the same branch.

I provide reinforcing means, shown as a saddle ring 15 of any suitable section and dimensions, to fix on reinforcement R, it being heavy enough to hold in their places the helices when they are subsequently severed; and the severed parts are bent, the bent parts 11 being united to the ring 15 as by welding.

Additional retainers spaced apart, one being shown at 11ᵃ, Figure 15 for example, are attached at will to ring 15, prior to uniting the ring to reinforcement R; these retainers also carry when preferred the hereinafter-mentioned crown ring 12. Some convolutions of reinforcement R are attached, as by welding, to any element contacting therewith, such points of contact with a retainer D being marked 9 in Figures 3 and 5; this fixes the convolutions against uncoiling, and facilitates safe severing of helices to prevent them obstructing a branch or bore.

The wires 11 produced by severance near ring 15 are kept long, and are bent at 10 outwardly. to form part of the branch reinforcement. If the parts 11 are too short, any convenient extensions will be attached. To connect to the outer ends of the bent wires 11, I provide a crown ring 12 of any suitable gauge which will assist to hold in place the branch reinforcement 13 or 14. The retainers 11ᵃ in Figure 15 form part of a cage, extending from ring 15 to ring 12. Blocks 16 of suitable material, as cementitious matter, are attached to reinforcement 13 or 14 at either or both sides as found desirable, and contain in some cases embedded wires having ends projecting for attachment to the reinforcement; or the blocks are moulded direct to the reinforcement.

Studs 17 are usable, one being shown on core H, to serve as handles to facilitate withdrawal of the said core.

Pipes and like hollow structures are often required having configurations of various designs which allow of easy jointing. For this purpose I show in Figure 2 an external, and in other figures provision for making an internal, circumferential recess.

A resilient transversely cut ring 18, which may have oblique ends as at 46, Figure 10, is usable to produce such a recess. It has in Figures 3, 6, and 7 a bevelled recess or recesses 19, formed with a shoulder 20 in its inner face.

In Figure 6, a latch block is shown having a head 21. The branch core H has one or more openings 25 (two shown) each to receive the head of a latch block which has bevelled faces 21ᵃ and is fixed on a spring 22, which is secured at one end to the core H, and has a finger 23 at its other end to facilitate retraction of the latch block should it jamb. The latch head projects through a shell opening 25 into a ring recess 19, the latch having a shoulder 24 which engages the shoulder 20 of the ring 18 holding the latter against outward displacement during the centrifugal action. I may substitute, instead of latches, a wedge, as 47 Figure 11, and/or stops, like those hereinafter described with reference to 53 Figure 11; stops, when attached to the core, preventing such displacement.

I provide the structure with screw tapped branch bore members or sockets 27 at will. These, see Figures 3, 5, 8 and 9, have flanging 28 (shown oblong), the sockets when embedded in the wall of the concrete structure being unable to rotate. The flange is shown with holes in it for keying, concrete filling the holes during the centrifugal action. I coat each socket member 27 at will with non-metallic, as cementitious, material 29 which will isolate the socket from neighbouring reinforcement such as the convolutions of wire R.

The socket is in Figure 8 positioned between two convolutions of wire R which have cross ties 32, 33, secured thereto as by welding, the ties holding the convolutions, just as saddle ring 15 holds convolutions. If a socket is too large to be located between two successive convolutions of reinforcement R, portions of the convolutions will be removed to allow of location of the socket without any obstruction of its bore, and other obstructing reinforcement, if any, would be removed. Any suitable number of these sockets will be inserted; the bores of each being closed against entrance of plastic material during the moulding process, a plug 30 being usable, having, for easy insertion or removal, a key square 31 which can occupy a core perforation $t$, for example. These plugs are, after the moulding, withdrawn, but can be reset; and in the latter case conveniently from outside the socket. Each socket will become centrifugally embedded in the structure. Each tubular socket is located with the flange internal of reinforcement R, which by strengthening the wall outwardly of the flange assists in preventing displacement of the socket. The non-metallic material 29 isolates the tubular part 27 from the metal reinforcement R. This advantage is not a feature of constructions which provide for inserting other forms of metal socket employing a small amount of concrete to fill the aperture made to receive the socket.

For contouring purposes I provide one or more transversely cut spring rings to form any desired recesses, such as 50 and 60 in Figure 14, in the pipes to be made.

Thus at one end of the rotor there is fitted a ring 40, and at the other end a ring 45, each resilient, ring 40 producing the recess 50, and ring 45 producing the recess 60; but configurations will be varied as required in practice.

As Figure 10 shows, ring 45 has oblique ends 46 adapted to be forced apart, for which purpose a wedge 47 (see Figure 11) is secured, by screws for example, to the face 48 of the member $S^1$ so that the ring will be located around the face 48 being then expanded and tending to contract. This means of positioning is applicable also to ring 18. The ring in Figures 10 and 11, has a ridge or projection $r^1$ adapted to function like the arcuate ridges $r$. Means, illustrated as stops 53, are shown to prevent displacement of ring 45 by the pressure of plastic material during the centrifugal action, a series of these stops being in practice secured spaced apart on member $S^1$, and if desired on the branch core H. The spring ring 40, Figure 2, tends to expand into and fills a recess 41 provided at the spigot end, and becomes located for service by the closing of the adjacent parts $i$ of mould M; or it will be, if desired, held against displacement by blocks 53 such as are shown by Figure 11; in some cases member $i$ is contoured to have the form indicated by ring 40, allowing the ring to be dispensed with. To produce any configuration, the use of a removable ring is advantageous. The resiliency of the rings may be such as to enable them to retain their working positions, without the use of groove 41, wedge 47, or blocks 53.

In Figure 13 I show, on member S, a riblike projection 43, a series of which is usable to produce passage ways 44. Figure 14, on the spigot or other face. Similar passage producing means may be applied in appropriate position as to the branch core surface 6 in Figure 3, and the surface 52 in Figure 4 of the configuring member $S^1$.

To manufacture a branched hollow structure, a pipe for example, of plastic material one kind of which is known as concrete or agglomerate, the apparatus is made ready for the concrete, and the rotor is rotated at the required velocity. The concrete is fed into the interior of the core C and passes through the perforations $t$ into the space which is enclosed between the mould M, core C, rings 40 and 45, and ends S, $S^1$.

The concrete will fill that space and simultaneously fill the offset space enclosed by the mould cover 2, core H, and shell 1; and on rotation at proper velocity the concrete will be homogeneously consolidated, both in the trunk and the branch, and will embed all reinforcement in allotted position.

After the consolidation the rotor is temporarily stopped, and removal is effected of the ring E, rings 38, core C, and brackets 34; and a finishing coat of fine grade material as cement is at will applied interiorly, by resuming rotation and adding the said material, after which the rotor will be stopped. Before applying the finishing coat, a gauge board (not shown) preferably having a metal scraping edge, is inserted if desired, resting upon surface $m$, or on ring E if the latter has been reinserted, and the rotor is slowly rotated to allow surplus plastic material to be removed to leave the pipe wall of the required, as of even, thickness.

It is then convenient to adjust the rotor position so that the branch mould will extend vertically; then bolts 5, cover 2, and the insertion 4 may be removed, and the branch core H may, by using studs 17 as handles, be slightly rotated and withdrawn. The said rotation frees the core H from adhering to the concrete. On the removal of core H ring 18 contracts configuring the annular recess described. When the concrete is sufficiently set, the annuli A, configuring elements S, and $S^1$ with wedge 47, and blocks 53, will be removed; and the ring 45 contracts, leaving the configured recess 60 described.

A part of the recess 60 will have a form produced by the wedge 47; that is, extending beyond the ring 45 (see Figure 11); and there will also be recesses left by blocks 53; the said part and recesses will be filled with plastic material and finished in any approved way. In order to retain the contour of the recess 60, and the recess contour formed by ring 18, there may be temporarily inserted in each a ring of suitable contour having withdrawal handles; such a ring can be left in place during subsequent finishing and handling of the pipe, to avoid damage to the recess surface. Similarly, a temporary ring could be used to protect the surface of the recess 50.

In practice the annular space 61, at either or both ends of the chamber formed by the combination of recesses 50, 60, in Figure 14, can be filled with any suitable packing to maintain the relative positions of the structures. This chamber can be supplied with means to form a fluid tight flexible joint; as a resilient U-section taper sided ring which will, under internal pressure of fluid, expand. Such fluid may enter through passages 44.

I claim:—

1. In the process of centrifugally producing a hollow branched structure of plastic material, moulding simultaneously the trunk and the/or each branch integrally to make the complete structure homogeneous.

2. The process of producing centrifugally a hollow reenforced branched structure, which consists in moulding simultaneously about a reenforcing structure the trunk and the/or each branch integrally to make the complete structure homogeneous.

3. In apparatus for centrifugally producing a hollow branched structure, an outer mould and an inner perforated core, between which is space for the trunk of the structure, and an outer mould and an inner core between which is space for a branch, the said spaces being adapted to be filled integrally by plastic material during centrifugal action producing a structure having the passage through its trunk and the passage through its branch uninterrupted.

4. In apparatus for centrifugally producing a hollow branched structure, an outer mould and an inner perforated core, between which is space for the trunk of the structure, and an outer mould and an inner core between which is space for a branch, the said spaces being adapted to be filled integrally by plastic material during centrifugal action producing a structure having the passage through its trunk and the passage through its branch uninterrupted, the spaces for receiving the plastic material containing reinforcement to be embedded by that material.

5. In apparatus for centrifugally producing a hollow branched structure, an outer mould and an inner perforated core, between which is space for the trunk of the structure, and an outer mould and an inner core between which is space for a branch, the said spaces being adapted to be filled integrally by plastic material during centrifugal action producing a structure having the passage through its trunk and the passage through its branch uninterrupted, the spaces for receiving the plastic material containing reinforcement to be embedded by that material, the said reinforcement being held in predetermined positions.

6. In apparatus for centrifugally producing a hollow branched structure, an outer mould and an inner perforated core, between which is space for the trunk of the structure, and an outer mould and an inner core between which is space for a branch, the said spaces being adapted to be filled integrally by plastic material during centrifugal action producing a structure having the passage through its trunk and the passage through its branch uninterrupted, the spaces for receiving the plastic material containing reinforcement to be embedded by that material, the said reinforcement being in predetermined position, the branch reinforcement having projections adapted to retain the reinforcement in position while the plastic material is subjected to centrifugal action.

7. In apparatus for centrifugally producing a hollow branched structure, an outer mould and an inner perforated core, between which is space for the trunk of the structure, and an outer mould and an inner core between which is space for a branch, the said spaces being adapted to be filled integrally by plastic material during centrifugal action producing a structure having the passage through its trunk and the passage through its branch uninterrupted, the spaces for receiving the plastic material containing reinforcement to be embedded by that material, the said reinforcement being in predetermined position, the branch reinforcement having blocks projecting to the core and/or mould to retain the reinforcement in position while the plastic material is subjected to centrifugal action and a removable contouring resilient ring or rings, the core carrying a wedge to hold apart the ends of the resilient ring or rings.

8. In apparatus for centrifugally producing a hollow branched structure, an outer mould and an inner perforated core, between which is space for the trunk of the structure, and an outer mould and an inner core between which is space for a branch, the said spaces being adapted to be filled integrally by plastic material during centrifugal action producing a structure having the passage through its trunk and the passage through its branch uninterrupted, the spaces for receiving the plastic material containing reinforcement to be embedded by that material, the said reinforcement being in predetermined position, the branch reinforcement having projections adapted to retain the said branch reinforcement in position while the plastic material is subjected to centrifugal action, removable contouring resilient means, a configuring end carrying means to hold the said resilient means, the configuring end having attached blocks spaced apart to hold the removable contouring means against displacement.

9. In apparatus for centrifugally producing a hollow reinforced structure, rotor elements having between them space for the reception of plastic material and having reinforcement in the said space, and removable means whereby parts of the said reinforcement are held in position to be embedded in the said material, the said means comprising arcuate ridges carried by a rotor element and contoured to facilitate withdrawal from the plastic material.

10. In apparatus for centrifugally producing a hollow reinforced structure, rotor elements having between them space for the reception of plastic material and having reinforcement in the said space, and removable means whereby parts of the said reinforcement are held in position to be embedded in the said material, the said means comprising arcuate ridges carried by a rotor element and bevelled to facilitate withdrawal from the plastic material.

11. In apparatus for centrifugally producing a hollow branched structure having its trunk and branch reinforced, positioning blocks on the said branch reinforcement, parts of which between the said blocks are secured to a reinforcing element or elements.

12. In apparatus for centrifugally moulding a hollow structure having its surface variously contoured, removable resilient contouring rings of alterable diameter, and means for holding the same so that their diameters and their positions for moulding purposes are as predetermined.

13. In apparatus for centrifugally moulding a hollow structure having its surface variously contoured, removable resilient contouring rings of alterable diameter, and a rotor element or elements carrying arcuate ridges which position the said rings during the moulding.

14. In apparatus for moulding centrifugally a hollow structure of plastic material, removable resilient configuring rings adapted to recess the structure circumferentially.

15. In apparatus for moulding centrifugally a hollow structure of plastic material, resilient configuring means to recess the structure surface, and means for securing the said configuring means in predetermined position.

16. In apparatus for moulding centrifugally a branched hollow structure of plastic material, an outer mould and an inner core between which is space for the trunk and/or each branch of the structure, the core within the trunk being apertured to allow of passage of the plastic material outward into the said space, and a resiliently mounted latch for the purpose set forth.

17. In apparatus for moulding centrifugally a branched hollow structure of plastic material, a trunk mould, a branch mould carried by the trunk mould, a trunk core, a branch core extending from the trunk core, the said moulds and cores forming a space for the plastic material, and removable covering means at the end of the branch moulding space, and means to prevent plastic material entering the branch bore from the trunk bore.

18. In apparatus for moulding centrifugally a branched hollow structure of plastic material, a trunk mould, a branch mould carried by the trunk mould, a trunk core, a branch core extending from the trunk core, the said moulds and cores forming a space for the plastic material, and removable covering means at the end of the branch moulding space, and means for use as handles for subsequently withdrawing the branch core.

19. In a rotor having means for moulding plastic material to form hollow structures, an apertured core, and stiffening frames secured within the core interior, the frames carrying resilient clips and removable rings peripheries of which are held in position by the said clips during rotation.

20. A branched hollow structure of plastic material having its trunk and branch reinforced, the branch reinforcement including parts of convolutions of trunk reinforcement formed by severing and diverting portions of the said trunk reinforcement, in combination with a member of ring form fixed at the angle of diversion to hold the severed convolutions against displacement.

21. A hollow structure integrally branched formed of centrifugally consolidated plastic material having at one end an internal circular recess and at the other end an external circular recess, such that when two such structures are aligned to form a joint the said recesses form a chamber adapted to contain jointing material, the branch having its end configured to provide a part of a like chamber.

22. A homogeneously fabricated branched hollow structure formed of plastic material centrifugally consolidated, and reinforced by metallic material, the reinforcement within the trunk of the structure being united to the branch reinforcement, the bore of the trunk and branch bores being continuous and uninterrupted, the reinforcement containing shouldered retainers, each shoulder being formed with projecting tongues adapted to position reinforcement.

23. In a homogeneously fabricated hollow structure formed of plastic material centrifugally consolidated, and having metal reinforcement, a tubular flanged branch member encased in non-metallic material and closable by a removable plug, the flange being located internally of the said reinforcement, the said tubular member being isolated from the said reinforcement.

24. In a rotor having means for moulding plastic material to form hollow structures, an apertured core, and stiffening frames secured within the core interior, the frames carrying resilient clips and removable rings which are during rotation held in position by the said clips.

In witness whereof I have hereunto set my hand.

CHARLES WILLIAM WATSON.